United States Patent [19]

Miyasaka

[11] Patent Number: 5,195,094
[45] Date of Patent: Mar. 16, 1993

[54] OPTICAL DISK APPARATUS

[75] Inventor: Yoshiyuki Miyasaka, Yokohama, Japan

[73] Assignee: Kabushiki Kaisha Toshiba, Kawasaki, Japan

[21] Appl. No.: 586,299

[22] Filed: Sep. 21, 1990

[30] Foreign Application Priority Data

Sep. 29, 1989 [JP] Japan .................................. 1-253957

[51] Int. Cl.$^5$ ............................................ G06F 11/00
[52] U.S. Cl. ......................................... 371/13; 371/59
[58] Field of Search ....................... 371/13, 47; 369/59

[56] References Cited

U.S. PATENT DOCUMENTS 4,458,349  7/1984  Aichelmann, Jr. et al. .......... 371/13
4,797,872  1/1989  Rokutan ................................ 369/59

Primary Examiner—Robert W. Beausoliel
Assistant Examiner—Allen M. Lo
Attorney, Agent, or Firm—Finnegan, Henderson, Farabow, Garrett and Dunner

[57] ABSTRACT

An optical disk apparatus comprises an optical disk driver for optically recording data to be recorded on an optical disk and optically reproducing recorded data, a RESYNC detecting circuit for detecting a RESYNC code from data reproduced by the optical disk driver, a control circuit for detecting error data occurring due to the erroneous detection of the RESYNC code by the RESYNC detecting circuit and restarting a reproducing operation upon detection of the error data, and a phase inverting circuit for inverting the phase of reproduction data in response to the error detection and outputting phase-inverted reproduction data to the control circuit for an error check. A RESNYC detecting circuit 14 can detect an invalid RESNYC signal by monitoring and comparing binary signal intervals (A1-A5) and reversed signal intervals (B1-B5) as shown in FIG. 3. The relationships between the intervals are as follows: A1 is not equal to B1, A2 is not equal to B2, A3 is not equal to B3, and A4 is not equal to B4; however, A5 equals B5. The RESNYC detecting circuit 14 determines whether the input RESNYC signal is a valid RESYNC code by monitoring the interval between the falling edges of the non-reversed video signal and the falling edges of the reversed video signal.

10 Claims, 4 Drawing Sheets

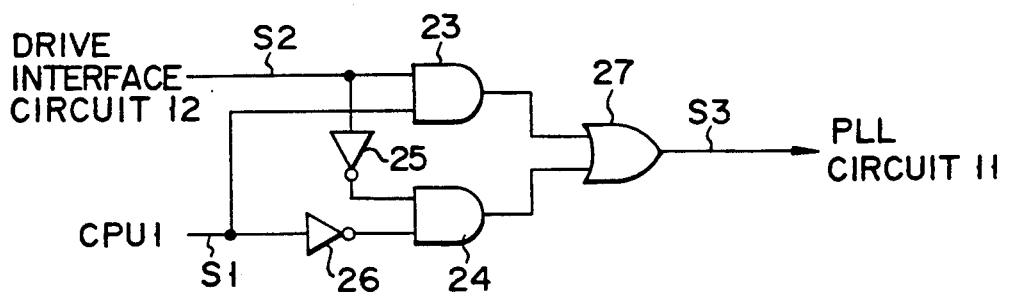
F I G. 2
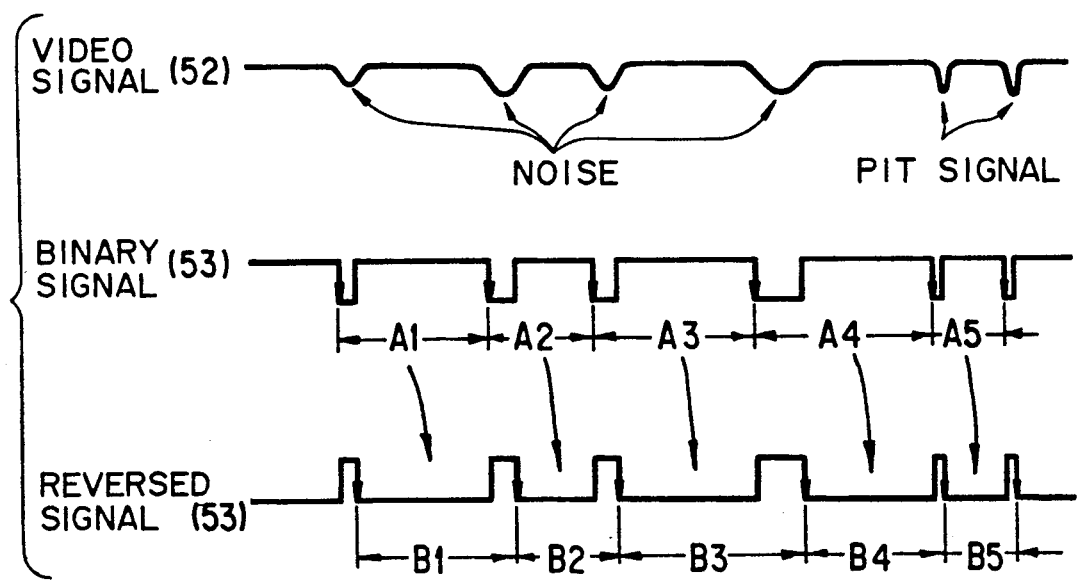
F I G. 3

OPTICAL DISK APPARATUS

BACKGROUND OF THE INVENTION

1. Field of the Invention

The present invention relates to an optical disk apparatus for optically recording/reproducing information, and, more particularly, to an optical disk apparatus which effectively executes a retry for data reproduction.

Conventionally, an information recording/reproduction apparatus, such as an optical disk apparatus for recording information on, and reproducing it from, a data recording medium, such as a rewritable type or erasable type optical disk, is designed so that an optical head, which is linearly movable in the radial direction of the optical disk by a linear motor, irradiates light on the optical disk for recording information on the optical disk or reproducing it therefrom. According to the prior art optical disk apparatus, foreign matter stuck on the surface of an optical disk or a scratch made thereon is likely to hinder the proper data reproduction. In such a case, a retry to try data reproduction again from that area which includes unreproducible data is executed.

If, for example, data in record data is erroneously detected as a RESYNC code, inserted for every predetermined bytes in record data in order to prevent a sync offset at the time of reproduction, due to a foreign matter or scratch existing on the surface of a optical disk, read data is resynchronized at the position of the erroneously-detected data. Therefore, subsequent data would all become error data. In such a case, the same erroneous results are repeated even if reading is repeatedly attempted under the same conditions, and a simple retry to read data again as mentioned above is insignificant.

SUMMARY OF THE INVENTION

It is therefore an object of the present invention to provide a highly-reliable optical disk apparatus which can properly reproduce record data even if an abnormality exists at a specific position on an optical disk in order to prevent a reread failure during due to a foreign matter or a scratch on the optical disk.

To achieve the object, according to this invention, there is provided an optical disk apparatus comprising a data output circuit for generating data to be recorded on a recording medium, a recording/reproducing device for optically recording the data from the data output circuit on the recording medium and optically reproducing the recorded data, a control circuit for detecting an error in data reproduced by the recording/reproducing device to output an error detection signal and permitting the recording/reproducing device to restart a reproduction operation, and a phase inversion circuit for inverting a phase of reproduction data in response to the error detection signal and outputting phase-inverted reproduction data to the control circuit for checking an error.

According to the present invention, when an error in reproduction data is detected, the phase of reproduced data is inverted and an error check is executed again. That is, a retry is executed. Accordingly, even data which has caused a reproduction abnormality after data erroneously detected as a RESYNC code, for example, becomes a pattern other than the RESYNC code or a data pattern, making this data reproduction data within a correctable range. Therefore, data following the erroneously detected data can be properly reproduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a circuit diagram of a phase selector;

FIG. 3 is a timing chart for explaining the operation of the phase selector;

DETAILED DESCRIPTION OF THE PREFERRED EMBODIMENT

Figure 1:
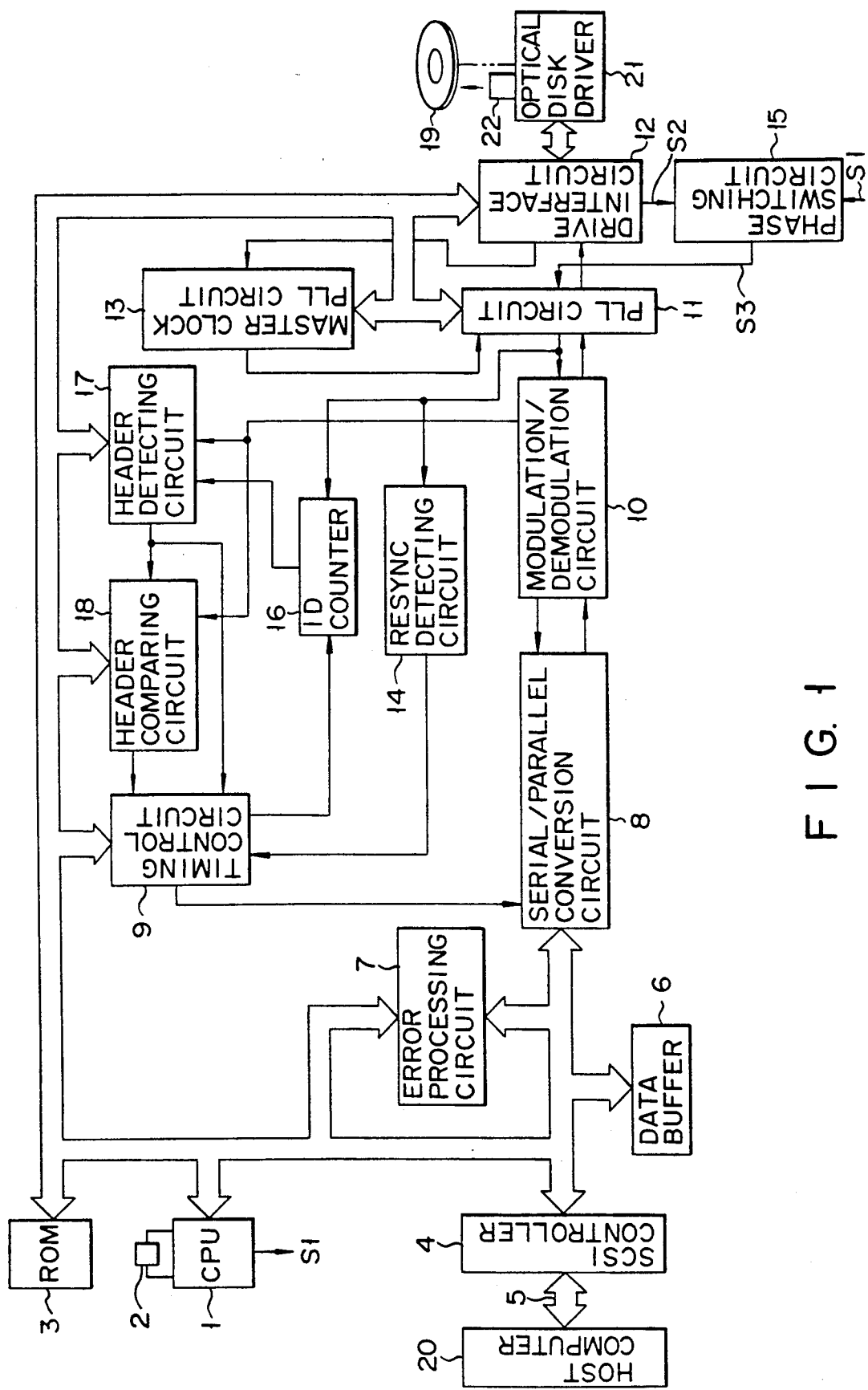
FIG. 1 is a block diagram of the first embodiment of an optical disk according to the present invention.

Referring to FIG. 1 illustrating an optical disk apparatus, an optical disk 19 has a metal coating layer of tellurium or bismuth coated on the surface of a disk-shaped substrate made of, for example, glass or plastic.

Figure 4:
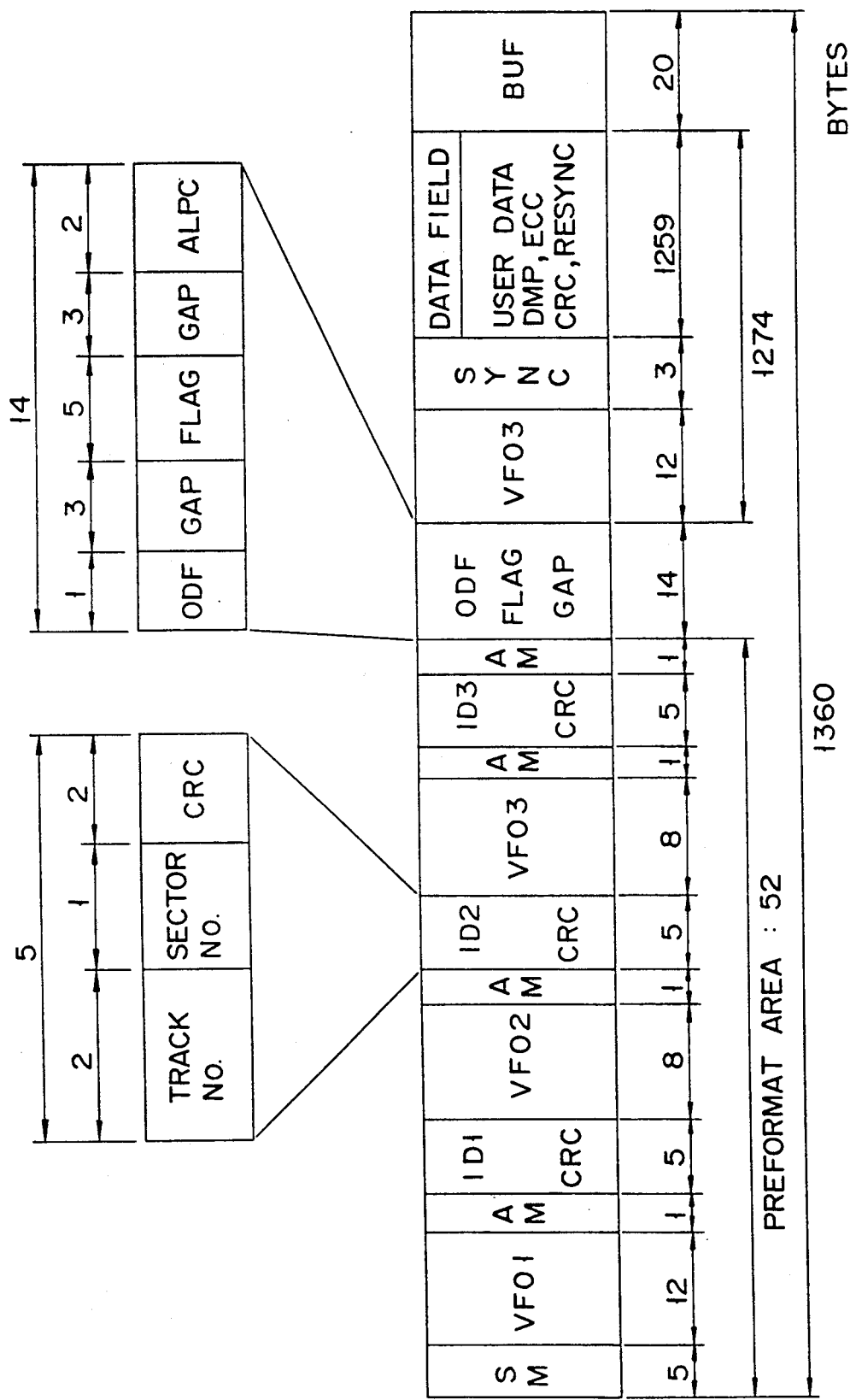
FIG. 4 is a diagram for explaining a sector format.

On the optical disk 19 are information-recording tracks formed in concentrically or spiral form. User data is recorded on the tracks in units of sectors. FIG. 4 illustrates the format of each sector on the optical disk 19. This format conforms to the standards of the ISO (Internal Standard Organization) of 1990.

With reference to FIG. 4, a 52-byte preformat area is for recording predetermined data at the time of manufacturing optical disks. SM is a sector mark where a special pattern indicating the beginning of a sector is recorded. Areas VFO1, VFO2 and VFO3 are used to store PLL control data. In an area AM is an address mark recorded. The track number and sector number of the associated sector are recorded in areas ID1, ID2 and ID3. CRC is a check code of ID1, ID2 and ID3. Data recording/reproduction to the optical disk 19 is managed by the track number and sector number. ODF is an offset detection flag which is used to detect a focus offset. FLAG is used to display a block in which data has been recorded. GAP is an unrecorded area or a gap. ALPC is an area used to automatic laser power control. SYNC is a sync code affixed to the head of data. A data field follows the SYNC.

The data field consists of 1259 bytes in total: user data of 1024 bytes and other data, such as ECC (Error Correction Code) are recorded in the data field.

Figure 5:
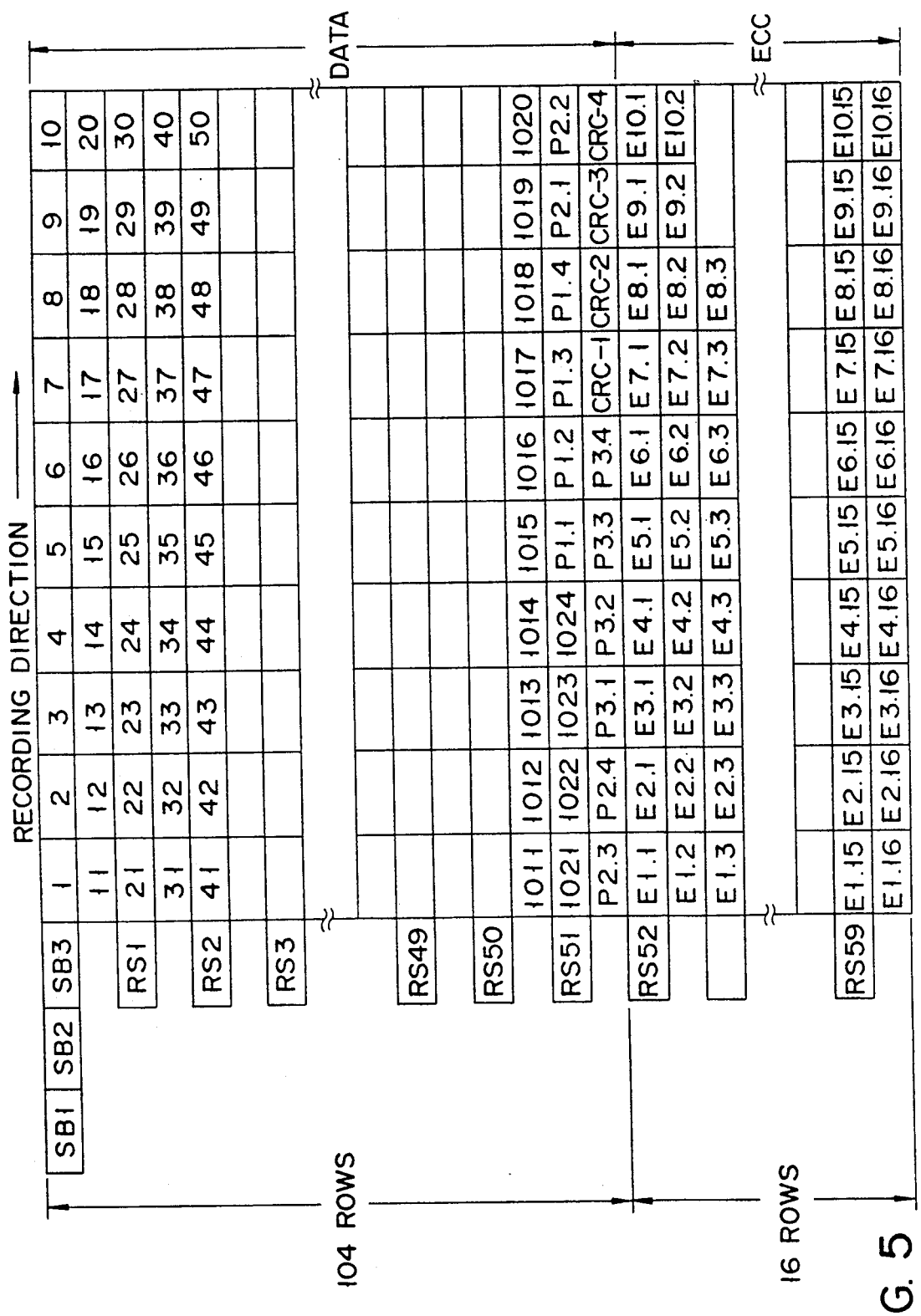
FIG. 5 is a diagram illustrating the structure of a data field of the sector format shown in FIG. 4.

The detailed format of the data field is illustrated in FIG. 5. This format is used in a case when 10-way interleaving including the ECC is executed: a 3-byte sync code SYNC (SB1, SB2, SB3) is provided at the head and a resync code RESYNC (RS1-RS59) is provided for every 20 bytes. The SYNC code is used to detect the timing for the head of data at the reproduction time, whereas the RESYNC code is used to compensate for a sync offset of data occurring during reproduction. Referring again to FIG. 4, P is a pointer indicating a defective portion, CRC is a check code and ECC indicates an Error Correction Code. The illustrated format is for one sector.

An optical disk apparatus embodying the present invention will be described below with reference to FIG. 1.

A CPU 1, which performs the general control of a control section of the optical disk apparatus, has an oscillator 2 and operates at an inherent timing. A program for operating the CPU 1 is stored in a ROM (Read Only Memory) 3.

A SCSI controller 4 is provided to execute data exchange with a host device, such as a host computer, 20 via a SCSI bus 5. A data buffer 6 temporarily stores data sent via the SCSI controller 4 from the host computer 20 or data to be sent via the SCSI controller 4 to the host computer 20. This data buffer 6 also serves as a working memory for an error processing circuit (or error correcting circuit) 7.

The error processing circuit 7 checks the validity of data input from the host computer 20 and generates an ECC that is affixed to data to be sent to an optical disk driver 21 (to be described later) and other control codes.

A serial-to-parallel converting circuit 8 converts parallel data stored in the data buffer 6 into serial data before sending it to a modulating/demodulating circuit 10, and converts serial data from this circuit 10 into parallel data and stores it in the data buffer 6 in synchronism with a timing signal from a timing controller 9. The modulating/demodulating circuit 10 performs, for example, 2-to-7 code modulation on serial data sent from the serial-to-parallel converting circuit 8 before sending it to a PLL (Phased Locked Loop) circuit 11, and demodulates data from the PLL circuit 11 before sending it to the circuit 8. The output signal of the modulating/demodulating circuit 10 is also supplied to a header detecting circuit 17 and a header comparator 18, which will be described later.

The PLL circuit 11 outputs data sent from the modulating/demodulating circuit 10 to a drive interface circuit 12 in synchronism with a predetermined clock, and outputs data from the drive interface circuit 12 to the modulating/demodulating circuit 10 in synchronism with a clock signal from a master clock PLL circuit 13. The PLL circuit 13 serves as a clock separating circuit to separate a clock from a self clock included in a reproduced digital modulation signal. The clock separated by the PLL circuit 13 is supplied to the PLL circuit 11 and is used as a clock for a reproduction signal.

The drive interface circuit 12 serves to control data exchange between a control section including elements 1 to 18 and the aforementioned optical disk driver 21, and sends and receives serial data. In other words, the drive interface circuit 12 sends data from the PLL circuit 11 to optical disk driver 21 and outputs data sent from the optical disk driver 21 to a phase switching circuit 15.

The phase switching circuit 15 sends reproduction data S2 received from the drive interface circuit 12 as it is or in a phase-inverted form as a signal S3 to the PLL circuit 11 in accordance with a control signal S1 from the CPU 1. As shown in FIG. 2, the phase switching circuit 15 comprises an AND gate 23 for receiving the signals S1 and S2, inverters 25 and 26 for respectively inverting the signals S2 and S1, an AND gate 24 connected to the outputs of the inverters 25 and 26, and an OR gate 27 connected to the outputs of the AND gates 23 and 24. When the signal S1 from the CPU 1 has a high level, the AND gate 23 is enabled and the AND gate 24 is disabled, so that the signal S2 from the drive interface circuit 12 is supplied as the signal S3 to the PLL circuit 11 without phase conversion, through the AND gate 23 and OR gate 27.

When the signal S1 from the CPU 1 has a low level, on the other hand, the AND gate 24 is enabled and the AND gate 23 disabled. As a result, the phase of the signal S2 from the drive interface circuit 12 is inverted by the inverter 25 and the phase-inverted signal is supplied as the signal S3 to the PLL circuit 11 via the AND gate 24 and the OR gate 27.

A RESYNC detecting circuit 14 receives reproduction data output from the PLL circuit 11 and detects if a RESYNC code is included in the reproduction data. Upon detection of the RESYNC code, this detecting circuit 14 outputs a detection signal to the timing controller 9. In response to the detection signal, the timing controller 9 resets the synchronization of reproduction data. Based on the control signal from the timing controller 9, this ID counter 16 counts ID and outputs the result to the header detecting circuit 17. The detecting circuit 17 acknowledges that input data is a header portion, from count data acquired by the ID counter 16 counting three identifications ID1, ID2 and ID3, and outputs a header detection signal to the header comparator 18. The header detection signal of the header detecting circuit 17 is also supplied to the timing controller 9. In response to the detection signal from the header detecting circuit 17, the comparator 18 compares header data stored in the CPU 1 with reproduction data output from the modulating/demodulating circuit 10, and outputs the comparison result to the timing controller 9: the comparator 18 outputs a header acknowledge signal to the timing controller 9 when the header data coincides with the reproduction data. The timing controller 9 outputs a timing control signal to the serial-to-parallel converting circuit 8 in response to the header acknowledge signal from the comparator 18. The circuit 8 converts the reproduction data to parallel data in response to the timing control signal from the timing controller 9.

The operation for executing a retry by the thus constituted optical disk apparatus will be described below.

First, in recording data on an optical disk, data is input to the SCSI controller 4 from the host computer 20, and is stored in the data buffer 6. Then, the error processing circuit 7 checks the validity of data stored in the data buffer 6 and generates an ECC or the like, thus arranging the data in the format as shown in FIG. 5. The data, formatted as shown in FIG. 5, is converted into serial data by the serial-to-parallel converting circuit 8, and is sent to the modulating/demodulating circuit 10. The serial data is modulated to a 2-to-7 code, for example, by the modulating/demodulating circuit 10. The modulated data is supplied to the PLL circuit 11. The PLL circuit 11 synchronizes the received data with a predetermined transfer clock and sends the synchronized data as write data to the optical disk driver 21 through the drive interface circuit 12. The optical disk driver 21 then writes the write data on the optical disk 19 through the optical head 22.

A description will now be given of the operation of reading recorded data from an optical disk.

First, the CPU 1 outputs a high-level signal S1 to the phase switching circuit 15 to set the phase switching circuit in a mode where phase inversion is not executed, and starts a reading operation. Data read out from the optical disk 19 by the optical disk driver 21 is supplied via the drive interface circuit 12 to the phase switching circuit 15. At this time, the phase switching circuit 15 does not invert the phase of the reproduction data and supplies the reproduction data with the same phase as received to the PLL circuit 11.

In the meantime, a clock signal is separated from the data supplied through the drive interface circuit 12 to the master clock PLL circuit 13, and is used as a reproduction clock in the PLL circuit 11. The data sent from the PLL circuit 11 is demodulated by the modulating-/demodulating circuit 10, is then converted into parallel data by the serial-to-parallel converting circuit 8. The parallel data is sequentially stored in the data buffer 6. In parallel with the aforementioned process, the data output from the PLL circuit 11 is supplied to the RESYNC detecting circuit 14. Upon detection of a RESYNC code, the detecting circuit 14 sends a detection signal to the timing controller 9. In response to this detection signal, the timing controller controls the serial-to-parallel converting circuit 8 for resynchronization if there is a sync offset.

When reading of a sequence of data is completed in the above manner, the CPU 1 checks whether or not data is properly reproduced. That is, the error processing circuit 7 checks the validity of the data using an ECC affixed as a redundancy code to reproduction data stored in the data buffer 6, and informs the CPU 1 of the result.

In other words, CPU 1 determines the error from the number of error bytes per a row, which cannot be corrected by the error processing circuit 7.

As shown in FIG. 3, when noise caused by a foreign matter or scratch or the like exists in a video signal reproduced from the optical disk besides a proper pit signal, a binary signal (FIG. 3) sent through the drive interface circuit 12 contains the binarized noise component, providing reproduction data with irregular pulse widths. If this reproduction data accidentally has such a cycle as that of a RESYNC pattern, the RESYNC detecting circuit 14 would erroneously detect the reproduction data as a RESYNC code. As a result, the logic circuit at the subsequent stage functions as if the accessed position of the reproduction data is the beginning of one line even when it is actually in a midway of a line of data. Data following the erroneously detected one becomes quite wrong or error data. The error data in this case exceeds the allowable limit of error correction done by the ECC. For example, when data "26" is detected as a RESYNC code "RS2" in FIG. 5, data "27" is recognized as head data and data including and following this data "27" is processed as error data. Such error data exceeds the allowable limit of error correction done by the ECC.

When the aforementioned error detection of the RESYNC code occurs and the CPU 1 judges that the reproduced data is not proper, the CPU 1 performs a retry. More specifically, the CPU 1 outputs a low-level signal S1 to the phase selector 15 to set the phase switching circuit 15 in a phase-inverting mode, and starts a rereading operation. In the rereading process, first the data reproduced from the optical disk 19 is supplied via the drive interface circuit 12 to the phase switching circuit 15. The phase of the reproduction data is inverted, and an inversion signal (see FIG. 3) is supplied to the PLL circuit 11.

Meanwhile, a clock signal is separated from data supplied via the drive interface circuit 12 to the master clock PLL circuit 13 and it is used as a reproduction clock in the PLL circuit 11. Data from the PLL circuit 11 is demodulated by the modulating/demodulating circuit 10. This circuit 10 detects the falling edge as indicated by the arrow in FIG. 3 to demodulate data, so that the demodulated signal has a different signal interval (pulse width) than the binary signal shown in FIG. 3. If reproduction data corresponding to noise or reproduced noise is erroneously detected as a RESYNC pattern, therefore, the phase of this reproduced noise is inverted to make the reproduced noise different from the RESYNC pattern. Consequently, the reproduced noise will not be erroneously detected as a RESYNC code. Since the correct RESYNC code is formed by pits considerably smaller than noise, even if the phase of the correct RESYNC code is inverted, the demodulated signal corresponding to this RESYNC code has a signal interval hardly different from that of the binary signal. The demodulated signal can therefore be recognized as a signal having a RESYNC pattern.

Data output from the modulating/demodulating circuit 10 is also converted into parallel data by the serial-to-parallel converting circuit 8 and this parallel data is sequentially stored in the data buffer 6. In parallel to the above operation, the data output from the PLL circuit 11 is supplied to the RESYNC detecting circuit 14 for detection of a RESYNC code. When the RESYNC code is detected, a detection signal is supplied to the timing controller 9. In response to the detection signal, the timing controller 9 controls the serial-to-parallel converting circuit 8 for resynchronization if there is a sync offset.

When reading of a sequence of data is completed in the above manner, the CPU 1 checks whether or not data is properly reproduced. That is, the error processing circuit 7 checks the validity of the data using an ECC affixed as a redundancy code to reproduction data stored in the data buffer 6, and informs the CPU 1 of the result. In this case, when an abnormality is recognized by erroneous detection of the RESYNC code, the above-described retry is executed to ensure reproduction of recorded data.

The present invention has been devised, paying attention to the fact that frequent occurrence of errors in data reproduced from that portion on an optical disk where a foreign matter sticks on the surface of the optical disk or a scratch is made, is likely to occur when sticking of a foreign matter is relatively light and the reproduction data accidentally becomes a pattern of RESYNC codes, so that such an event can be avoided if the reproduction data is not erroneously detected as a RESYNC pattern. More specifically, in performing a retry upon detection of an error equal to or greater than a predetermined value in reproduction data, the phase of the reproduced data is inverted and the retry is executed.

Inverting the phase of the reproduction data permits erroneous detection of a RESYNC code to be recognized from the difference between the pulse width of the phase-inverted demodulated signal and that of the demodulated signal having its phase non-inverted. The pattern of RESYNC codes resulting from the erroneous detection is a pattern other than the RESYNC codes, i.e., a data pattern. Since this data pattern is often within a correctable range, this data can therefore be reproduced without problems. Therefore, it is possible to avoid an event of making all the reproduction data following the erroneously-detected data as error data, thus increasing the significance of executing a retry.

Additional advantages and modifications will readily occur to those skilled in the art. Therefore, the invention in its broader aspects is not limited to the specific details, and representative devices, shown and described herein. Accordingly, various modifications can be made without departing from the spirit or scope of the general inventive concept as defined by the appended claims and their equivalents.

What is claimed is:

1. An optical disk apparatus comprising:
   means for generating data to be recorded on a recording medium; the data including user's data and a RESYNC code used for compensating a sync offset of data occurring during reproduction;
   recording/reproducing means connected to said data generating means, for optically recording the data generated by said data generating means on said recording medium and optically reproducing recorded data;
   RESYNC detecting means for detecting the RESYNC code included in the data reproduced by said recording/reproducing means;
   detecting means connected to said recording/reproducing means, for detecting an error in the data reproduced by said recording/reproducing means and permitting said recording/reproducing means to re-reproduce the recorded data in response to the detection of the error;
   inverting means connected to said recording/reproducing means, for inverting the phase of the re-reproduced data and outputting phase-inverted re-reproduced data to said RESYNC detecting means so that said RESYNC detecting means re-detects a RESYNC code in the phase-inverted re-reproduced data; and
   means for compensating a sync offset of data occurring during reproduction in response to the RESYNC code detected by said RESYNC detecting means.

2. The optical disk apparatus according to claim 1, wherein said reproduced data includes a plurality of RESYNC codes each having a RESYNC pattern with a constant pulse interval, and said RESYNC detecting means includes means for detecting the RESYNC pattern with the constant pulse interval and outputting a RESYNC detection signal to said compensating means.

3. The optical disk apparatus according to claim 2, wherein said RESYNC detecting means comprises means for detecting an interval between the falling edges of pulses included in the RESYNC pattern and outputting the RESYNC detection signal when it detects an constant interval.

4. An optical disk apparatus comprising:
   data generating means for generating data to be recorded on a recording medium, the data including user's data and RESYNC code used for compensating a sync offset of data occurring during reproduction;
   recording/reproducing means for optically recording the data generated by said data generating means on said recording medium and optically reproducing recorded data;
   control means for determining an error in said data reproduced from said recording medium by said recording/reproducing means to output an error detection signal, and permitting said recording/reproducing means to restart a reproduction operation in response to the error detection signal;
   RESYNC detecting means for detecting the RESYNC code in the reproduced data;
   phase inverting means, for inverting the phase of the reproduced data in response to the error signal and outputting phase-inverted reproduced data, said phase inverting means including means for passing the reproduced data when said control means detects no error in the reproduced data; and
   means for compensating a sync offset of data occurring during reproduction in response to the RESYNC code detected by said RESYNC detecting means.

5. The optical disk apparatus according to claim 4, wherein said phase inverting means comprises gate circuit means for passing the reproduced data when no error signal is supplied to said phase inverting means, an inverter means for inverting the phase of said reproduced data in response to said error signal.

6. The optical disk apparatus according to claim 4, wherein said phase inverting means comprises a first AND gate for receiving the reproduced data, two inverters for respectively inverting the phases of said reproduced data and said error detection, second AND gate connected to outputs of said inverters, and an OR gate connected to outputs of said first and second AND gates.

7. The optical disk apparatus according to claim 4, wherein said RESYNC detecting means comprises means for detecting reproduced data having a predetermined signal pattern as a RESYNC code.

8. The optical disk apparatus according to claim 4, wherein said reproduced data includes a plurality of RESYNC codes each having a RESYNC pattern signal with a constant pulse interval and said RESYNC detecting means includes means for detecting the RESYNC pattern signal with the constant pulse interval and outputting a RESYNC detection signal to said compensating means.

9. The optical disk apparatus according to claim 8, wherein said RESYNC detecting means comprises means for detecting an interval between the falling edges of pulses included in the RESYNC pattern signal and outputting the RESYNC detection signal when it detects an constant interval.

10. An optical disk apparatus comprising:
    information outputting means for generating information to be recorded on an optical disk, said information including user's data and a RESYNC code used for compensating a sync offset of the information during reproduction;
    recording/reproducing means for optically recording the information generated by said information outputting mean on said optical disk and optically reproducing recorded information;
    control means for detecting an error in said information reproduced by said recording/reproducing means to output an error detection signal and permitting said recording/reproducing means to restart a reproduction operation;
    RESYNC detecting means for detecting the RESYNC code in the reproduced information;

phase inverting means for inverting the phase of the reproduced information in response to the error detection signal and outputting phase-inverted reproduced information to said RESYNC detection means for check a RESYNC error;

means for compensating a sync offset of data occurring during reproduction in response to the RESYNC code detected by said RESYNC detecting means, modulating/demodulating means for modulating information from said information outputting means and demodulating said reproduced information;

serial-to-parallel converting means for converting information from said information outputting means into serial information and outputting said serial information to said modulating/demodulating means, and converting the reproduced information from said modulating/demodulating means into parallel information.

* * * * *